United States Patent [19]
Kasselmann et al.

[11] 3,825,308
[45] July 23, 1974

[54] PROPORTIONING VALVE CONTROL MEANS

[75] Inventors: John T. Kasselmann, Southfield; Michael B. Goran, Bloomfield, both of Mich.

[73] Assignee: The Bendix Corporation, Sound Bend, Ind.

[22] Filed: Apr. 30, 1973

[21] Appl. No.: 355,615

[52] U.S. Cl. ............... 303/21 A, 188/349, 303/6 C, 303/20
[51] Int. Cl. ............................................. B60t 8/26
[58] Field of Search ...... 137/505, 12; 188/195, 349; 303/6 C, 20, 21, 24

[56] References Cited
UNITED STATES PATENTS

| | | | |
|---|---|---|---|
| 3,275,384 | 9/1966 | Hirzel | 303/21 EB |
| 3,433,536 | 3/1969 | Skinner | 303/21 A |
| 3,694,038 | 9/1972 | Ingram et al. | 303/21 F |
| 3,697,138 | 10/1972 | Marting | 303/6 C |

FOREIGN PATENTS OR APPLICATIONS

| | | | |
|---|---|---|---|
| 988,261 | 4/1965 | Great Britain | 303/21 A |

*Primary Examiner*—Trygve M. Blix
*Assistant Examiner*—Stephen G. Kunin
*Attorney, Agent, or Firm*—, Jr. McCormick; William N. Antonis

[57] ABSTRACT

A system of selectively controlling a plurality of proportioning valves through means of a computer control signal. The control signal is derived by dividing a first signal representative of the available fluid pressure output from a master cylinder by a second signal representative of the rate of change in speed of a vehicle. A plunger valve responsive to the control signal is moved to allow fluid to flow in a selected flow path. The fluid will activate the rear wheel brakes with a force proportional to the front wheel brakes to provide optimum braking during deceleration.

11 Claims, 2 Drawing Figures

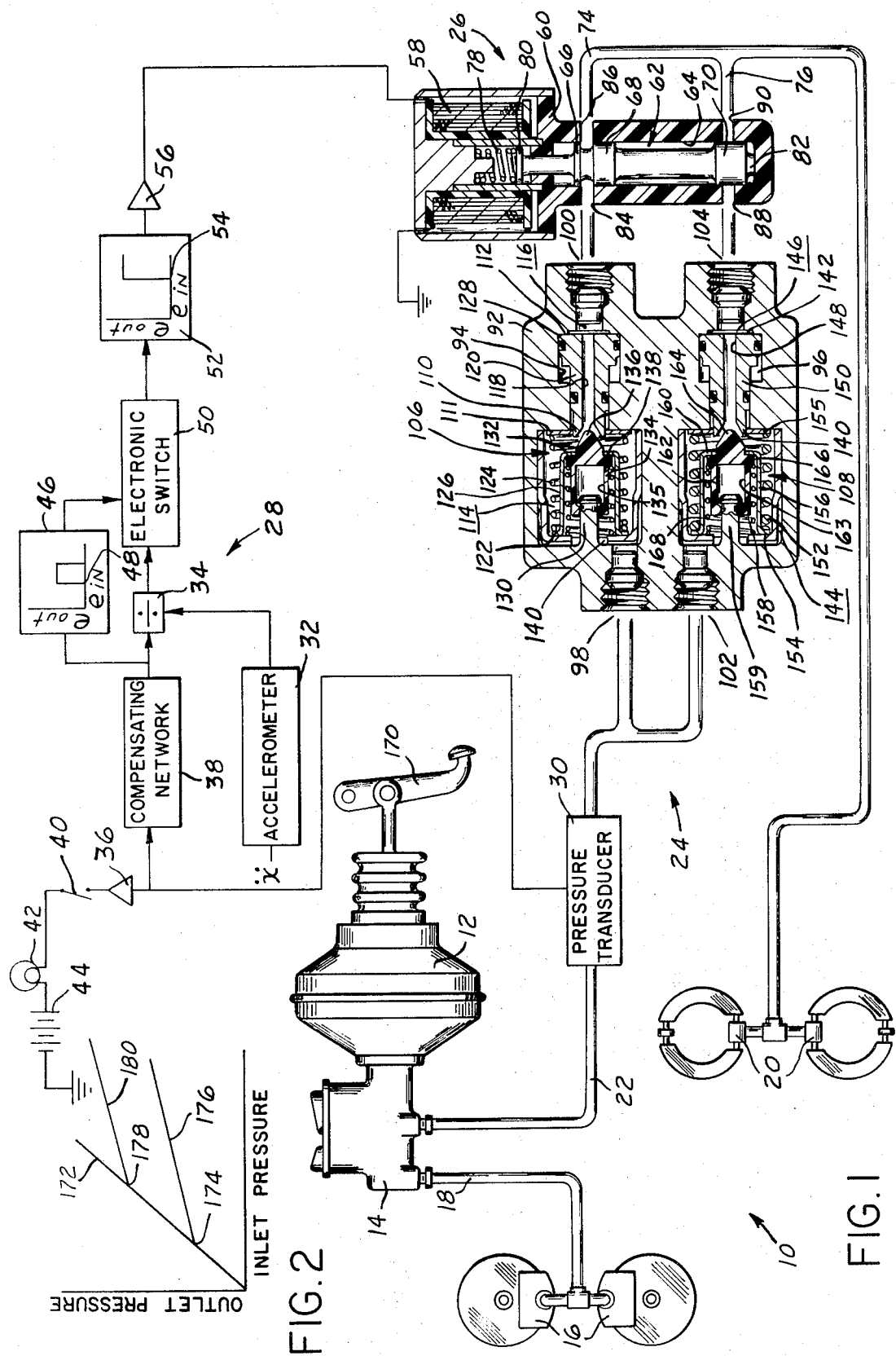

PROPORTIONING VALVE CONTROL MEANS

BACKGROUND OF THE INVENTION

The Department of Transportation has proposed guidelines for vehicle stopping distances in accordance with acceptable safety standards which compensate for mental and mechanical delays which arise during a braking application. To meet these safety standards, vehicle manufacturers have investigated many proposed devices. To date, antiskid braking systems will meet these safety standards. However, the relatively high cost of such antiskid systems has retarded widespread customer acceptance.

As an alternate solution, vehicle manufacturers have proposed the placing of a proportioning valve in the braking system to provide a fixed force relationship between the front wheel brakes and the rear wheel brakes. The proportioning valve will compensate for erratic braking caused by an overturning movement and is physically indicated as a weight shift from the rear wheels to the front wheels during deceleration. Because of this indicated weight shift, larger brakes have been installed on the front wheels of most vehicles. This improved the front end braking but still did not alleviate "lock-up" of the rear wheel brakes during "fade" conditions.

In U.S. application Ser. No. 324,032, incorporated herein by reference, a pressure responsive proportioning valve was introduced which for any vehicle with a fixed weight prevents rear wheel "lock-up." However, in trucks and buses wherein the load can vary from day to day, "lock-up" of the rear wheels is still possible.

In U.S. application Ser. No. 326,349, incorporated herein by reference, a load sensing proportioning valve means is disclosed to account for variances due to load weight changes. This load sensing device requires a direct connection between rear axle and the frame of the vehicle. Unfortunately, the sensing device is in a position vulnerable to road hazards such as flying rocks, mud, snow, ice, etc.

SUMMARY OF THE INVENTION

Through experimentation, it has been determined that a fixed proportioning valve changes the relationship between braking the front wheels and rear wheels as a function of brake line pressure. The operation of such a proportioning valve assumes that deceleration is an unvarying indirect function of brake line pressure. In reality, however, we have discovered that the relationship between deceleration and brake line pressure varies with the mass of the vehicle at any given time period. With trucks and buses, the total mass of the vehicle varies over a large range, between an empty weight and fully loaded. To provide good braking, the proportioning relationship between the braking of the front wheels and the rear wheels must be continually varied.

We have found that by sensing vehicle deceleration and brake line pressure, a signal can be derived which will simulate the vehicle's mass. This signal is analyzed in a comparator means to provide an operational signal for selectively positioning a solenoid means and provide a flow path through which hydraulic fluid is supplied to the rear brakes.

It is therefore the object of this invention to provide a control means for proportioning the rear wheel brakes of a braking system with optimum hydraulic fluid under pressure in relation to the front wheel brakes.

It is another object of this invention to provide an approximation of the mass of a vehicle by comparing a relationship between an available master cylinder fluid pressure and the rate of change in vehicular speed during deceleration.

It is still another object of this invention to provide a solenoid means responsive to a continually varying control signal for selecting a flow path of fluid under pressure from a master cylinder to operate the rear wheel brakes in a braking system in a proportioned relationship with the front wheel brakes.

It is still a further object of this invention to provide a braking system with a solenoid operated proportioning valve means with an indicator to provide an indication that a brake application is occurring.

These and other objects will be readily understood from viewing the drawing and reading this application.

BRIEF DESCRIPTION OF THE DRAWING

FIG. 1 is a schematic illustration of a braking system of a vehicle with a solenoid operated proportioning means responsive to a continually varying signal derived by modifying a first signal representative of the available fluid pressure in a master cylinder with a second signal representative of the rate of change in vehicle speed during a braking application.

FIG. 2 is a graph showing the changes in the relationship of inlet pressure to outlet pressure with changes in mass of the vehicle.

DETAILED DESCRIPTION OF THE PREFERRED EMBODIMENT

The braking system 10 shown in FIG. 1 has a servomotor means 12 connected to a master cylinder 14 for supplying hydraulic fluid under pressure to the front wheel brakes 16 through conduit 18 and to the rear wheel brakes 20 through conduit 22. A proportioning valve means 24 is located in conduit 22 to control the flow of hydraulic fluid supplied to the rear wheel brakes 20 as a function of the hydraulic fluid supplied to the front wheel brakes 16 in a direct relationship to the mass of the vehicle. The proportioning valve means 24 is controlled by a solenoid means 26. The solenoid means 26 is responsive to an operational signal supplied by a computer means 28 for selectively directing hydraulic fluid in conduit 22 in a flow path to the rear wheel brakes 20. The computer means 28 derives the operational signal by comparing a first signal supplied from transducer means 30, representing the available hydraulic fluid pressure in conduit 22 with a second signal supplied from an accelerometer 32 to provide a continuous indication of any change in mass of the vehicle which could affect the operation of the proportioning valve means 24.

The deviation of the operational signal follows Newton's law of dynamics where $$M = F_b/d \qquad (1)$$

where:
 $F_b$ = braking force
 $d$ = vehicle deceleration
 $M$ = vehicle mass

It has been determined that braking force ($F_b$) can be approximated through the following formula:

$$F_b = f(P\ m/c) \times r_w \quad (2)$$

where:
$P\ m/c$ = hydraulic pressure available from the master cylinder
$r_w$ = effective wheel radius of the vehicle Upon substitution of equation (2) into equation (1) the mass of the vehicle is represented as follows:

$$M = [f(P\ m/c)\ r_w]/d \quad (3)$$

For any given vehicle, the wheel radius ($r_w$) will essentially remain constant and as a result the indicated mass for any given time period during a brake application can be continually represented as an electrical signal derived by dividing the output from the master cylinder 14 by the rate of change in speed of the vehicle during deceleration as measured by the accelerometer 32.

The accelerometer 32 can be of a type wherein a plumb bob is centrally positioned by a plurality of resilient members. The accelerometer is located along the axial center line of the vehicle and the corresponding resilient member attached to strain gages. During acceleration the plumb bob affects the strain gages in a first manner and correspondingly, while decelerating in a second manner. While decelerating, the accelerometer transmits an electrical signal representative thereof to the divider means 34 to modify a signal from the transducer means 30.

The transducer means 30 can be of a type wherein movement by a piston in response to the hydraulic fluid under pressure in conduit 22 is converted into a corresponding electrical signal. The electrical signal is simultaneously transmitted to an amplifier 36 and a compensating network 38. The amplifier 36 will close a switch 40 and permit indicator means 42 to be energized by electrical current source 44. The compensating network 38 will account for system dynamics and nonlinearities in the brake pressure torque relationship between the output from the master cylinder 14 and the wheel brakes 20.

Thus, the operational signal from the transducer means 30 will be transmitted from the compensating network 38 into the divider 34 and a first comparator 46.

The first comparator 46 upon the operational signal reaching a predetermined limit (which can be adjusted to account for different weight vehicles) shown as point 48 will transmit an actuation signal to switching means 50. The switching means 50 upon being activated will allow the output of the divider 34 to flow into a second comparator 52.

Upon the output signal from the divider 34 reaching a predetermined limit 54 as received by the second comparator 52, an activation signal is relayed through amplifier 56 to the coil 58 of the solenoid means 26.

The solenoid means 26 has a housing 60 which holds the coil 58 in axial alignment with a plunger means 62 located in bore 64. The plunger means 62 has a series of lands 66, 68 and 70 which control the output flow through the proportioning valve means 24 in a first path 74 or in a second path 76 in response to the operational mode determined by the computer means 28. A spring 76 located between the housing 60 surrounding the coil 58 and the end 80 of the plunger means 62 urges end 82 against the housing in the bottom of bore 64. In this mode associated a vehicle which is lightly loaded, the hydraulic fluid under pressure in conduit 22 will pass through a first inlet 84 and out a first outlet 86 between the lands 66 and 68. Land 70 will prevent hydraulic fluid communication between a second inlet 88 to a sound outlet 90 by blocking the second path 76 from the proportioning means 24 associated with a fully or heavily loaded vehicle.

The proportioning means 24 has a housing 92 with a first bore 94 and a second bore 96 located therein. The first bore has a first inlet 98 connected to conduit 22 and a first outlet 100 connected to the first inlet 84 in the housing 60 of the solenoid means 26. The second bore 96 has a second inlet 102 connected to conduit 22 and a second outlet 104 connected to the second inlet 88 of the housing 60.

A first piston means 106 is located in bore 94 and a second piston means 108 is located in bore 96. The first piston means has a first inlet surface 110 and a first outlet surface 112. The first inlet surface 110 has a smaller area than the first outlet surface 112. The space between the housing 92 and the first inlet surface forms a first inlet chamber 114 while the space between the first outlet surface 112 and the housing 92 forms a first outlet chamber 116. A passage 118 located in the stem 120 of the first piston means 106 connects the first inlet chamber 114 with the first outlet chamber 116. A first stage resilient means 124 located in the first inlet chamber 114 between an outwardly projecting flange 122 of a sleeve 126 and a first disc 111 urges the first outlet surface 112 against the bottom 128 of the bore 94. The sleeve 126 which surrounds a guide 130 has an inwardly projecting flange 132 on the end opposite the outwardly projecting flange 122. A resilient stop 134 located in the sleeve 126 has a concentric bore 135 which surrounds guide 130 to maintain a tapered poppet 136 in axial alignments with passage 118. A rib 138 located at the base of the tapered poppet 136 is urged toward the inwardly projecting flange 132 by a second resilient means 140. The second resilient means 140 will permit the resilient stop 134 to move on the guide 130 upon the tapered poppet 136 engaging that portion of the stem 120 surrounding passage 118 to permit expansion and contraction of the outlet chamber 116 during surges of varying hydraulic pressure in conduit 22.

The second piston means 108 is brought into operation in response to movement of the plunger means 62 being moved by magnetic flux lines in coil 58 created by the activation signal from the computer means 28.

The second piston means 108 has a second inlet surface 140 and a second outlet surface 142. The second inlet surface 140 has a smaller area than the second outlet surface 142. The space between the housing 92 and the second inlet surface 140 forms a second inlet chamber 144 while the space between the second outlet surface 142 and the housing 92 forms a second outlet chamber 146. A passage 148 located in the stem 150 of the second piston means 108 connects the second inlet chamber 144 with the second outlet chamber 146. A second stage resilient means 152 located in the second inlet chamber between an outwardly projecting flange 154 of a sleeve 156 and a second disc 155 urges the second outlet surface 142 against the bottom of the bore 96. The sleeve 156 which surrounds a guide 158 has an inwardly projecting flange 160 on the end opposite the outwardly projecting flange 154. A resilient stop 162 located in the sleeve 156 has a concentric bore 163 which surrounds guide 159 to maintain a tapered poppet 164 in axial alignment with passage 148. A rib 166 located at the base of the tapered poppet 164 is urged toward the inwardly projecting flange 160 by a second resilient means 168. The second resilient means 168 will permit the resilient stop 162 to move on the guide 158 upon engagement of the tapered poppet 164 with that portion of the stem 150 surrounding the passage 148 to permit expansion and contraction of the second outlet chamber 146 during surges of hydraulic pressure in conduit 22 in the second stage of operation.

MODE OF OPERATION OF THE PREFERRED EMBODIMENT

When a vehicle equipped with a braking system 10 is moving and an operator desires to stop, an input force is applied to brake pedal 170. This input force activates the servomotor 12 to provide an output force which operates the master cylinder 14. The master cylinder 14 supplies hydraulic fluid under pressure through conduit 18 to the front wheel brakes 16 and through conduit 22 to the rear wheel brakes 20.

Before reaching the rear wheels 20, the hydraulic fluid in conduit 22 must pass through the proportioning valve means 24. Initially, the hydraulic fluid under pressure will flow through the first inlet port 98 into the inlet chamber 114 and through the passage 118 to the outlet chamber 116. From the outlet chamber 116, the hydraulic fluid will flow through the outlet 100 to the first flow path 74 in the solenoid means 26.

The pressure transducer 30 will receive the same hydraulic fluid pressure as the first inlet chamber 114 and convert this hydraulic pressure into a corresponding electrical signal which will be transmitted to the computer means 28 through the compensating network 38. The pressure build-up in the first inlet chamber 114 will follow a curve similar to line 172, in FIG. 2, up to a point 174 where the pressure in the outlet chamber 116 will act on the outlet surface to move the piston means 24 against the resilient stop 134 by overcoming the first stage resilient means 124. Any further build-up of pressure in the inlet chamber 114 will act on the first surface 110 to move the piston means 106 away from the tapered poppet 136 to allow further hydraulic fluid build-up in the outlet chamber 116. The hydraulic fluid build-up in the outlet chamber 116 will follow curve 176 as compared to the hydraulic fluid build-up in the inlet chamber 114 which is approximated by line 172.

Before the hydraulic fluid pressure build-up in outlet chamber 116 is sufficient to overcome the first stage resilient means 124, the first electrical signal emerging from the compensating network 38 will have been analyzed in the comparator 46 to produce a switching signal upon reaching an activation level 48. The switching signal will place the electronic switch 50 in the "ON" position and allow the output from divider means 34 to be presented to the second comparator 52. If the stopping signal representing the rate of change in vehicle speed resulting from the application of the brakes upon modifying the first electrical signal from the transducer means 30 is less than a preselected value 54 in the second comparator means 52 an effective braking condition is indicated. However, if the first electrical signal upon being divided by the signal from the accelerometer 32 is greater than the threshold signal level 54, an operational signal is sent through amplifier 56 to energize the coil 58. Upon coil 58 being energized plunger means 62 is moved toward the coil 58 by magnetic attraction by overcoming positioning spring 78 to sequentially place land 68 over the inlet port 84 and remove land 70 from the second inlet port 88 to open the second flow path 76 through the proportioning means 24. Since the second stage resilient means 152 is stronger than the first stage resilient means 124, the rear wheel brakes 20 will receive the same hydraulic fluid pressure that is present in the second inlet chamber 144 until point 178 is reached. At this point the hydraulic fluid under pressure in the second outlet chamber 146 will have acted on the second outlet surface 142 to overcome the second stage resilient means 152 to have seated the area around passage 148 on the tapered poppet 164. Any further increase in the hydraulic fluid received in the second inlet chamber 144 will be proportioned through the interaction of the pressure acting on the second inlet surface 140 and the second stage resilient means 152 resisting the pressure acting on the second outlet surface 142.

Upon the vehicle decelerating at a rate sufficient to bring the vehicle to a safe stop, the second comparator 52 will terminate the operational signal to the coil 58. With the operational signal in the coil 58 terminated, spring 78 will move the plunger to sequentially close the second path 76 by land 72 and open the first path 74 to allow the first stage proportioning of the valve 24 to resume control over the hydraulic fluid supplied the rear wheels 20.

Thus, we have provided a braking system with a control means for selectively directing an operational hydraulic fluid to the rear brakes in response to an indicated deceleration condition produced by the output of a master cylinder to function in a proportioned relationship with the front wheel brakes and provide optimum braking.

We claim:

1. Control means for regulating the communication of fluid through a conduit located between a pressure intensifier and the rear wheel brakes of a vehicle to provide optimum fluid pressure during a brake application, said control means comprising:

transducer means connected to said pressure intensifier for continually transmitting a first signal representative of the fluid pressure available in said conduit;

compensating means for modifying said first signal to account for system dynamics resulting in nonlinearity in the transmission of the first signal developed by a time lag in mechanical transmission;

accelerometer means for measuring a rate of change in speed of said vehicle during the brake application to produce a second signal representative thereof;

computer means connected to said accelerometer means and said transducer means for dividing said first signal by said second signal to produce an operational signal indicative of a change in mass of the vehicle;

first comparator means connected to said transducer means for evaluating said first signal to provide a threshold corresponding to a first braking condition associated with a vehicle having a first mass; and solenoid means responsive to said operational signal for allowing the fluid in the conduit to flow in a path to permit the actuation of the rear wheel brakes as a direct function of the actuation fluid pressure to the front wheel brakes.

2. The control means, as recited in claim 1, wherein said computer means further includes:

switch means responsive to the first comparator for allowing said operational signal to be transmitted.

3. The control means, as recited in claim 2, wherein said computer means further includes:

second comparator means connected to said switch means and responsive to an operational signal corresponding to a second braking condition associated with a vehicle having a second mass for transmitting said operational signal to said solenoid means.

4. The control means, as recited in claim 3, wherein said solenoid means includes:

plunger means selectively positioned by said second comparator means and a resilient means for establishing the flow path to said rear wheel brakes.

5. The control means, as recited in claim 4, wherein said transducer means further includes:

latching means connected to an indicator for producing an indication that a brake application is occurring.

6. The control means, as recited in claim 5, wherein said flow path of the fluid in the conduit as determined by the second comparator means will permit a fluctuation in the quantity of fluid required in said brake application corresponding to said operational signal.

7. In a power braking system for a vehicle having a pressure intensifier supplying hydraulic fluid under pressure through a first conduit to the front wheel brakes and to the rear wheel brakes through a selected flow path provided by a plurality of proportioning means in a second conduit the improvement comprising:

solenoid means connected to the second conduit supplying the rear wheel brakes for sequentially interrupting the flow of hydraulic fluid through one of said plurality of proportioning means and permitting flow through another of said plurality of proportioning means to compensate for changes in mass affecting the operation of the rear wheel brakes; and switching means connected to said solenoid means for controlling said flow path through one of said plurality of proportioning means at a given time period corresponding to a change in mass in the vehicle to provide optimum braking during deceleration.

8. The power braking system, as recited in claim 7, wherein said switching means includes:

transducer means for converting the pressure of the hydraulic fluid supplied the rear wheel brakes into a first operational signal;

measuring means for determining the rate of change in speed of said vehicle during deceleration and developing a second operational signal representative thereof; and computer means for modifying the first operational signal by the second operational signal to produce a braking signal, said braking signal being matched with a known signal to provide an output signal indicative of a known comfortable safe braking deceleration for an indicated mass for operating said solenoid means.

9. The power braking system, as recited in Claim 7, wherein said computer means includes:

comparator means for evaluating the first operational signal with the second operational signal to provide a continuous indication of any change in mass of the vehicle which could affect the operation of the solenoid means.

10. The power braking system, as recited in claim 7, wherein said solenoid means includes:

plunger means selectively positioned by said braking signal and a resilient means for establishing the flow path to said rear wheel brakes.

11. The control means, as recited in claim 10, wherein said transducer means further includes:

latching means connected to an indicator for producing an indication that a brake application is occurring.

* * * * *